Feb. 8, 1938.    J. E. PADGETT    2,107,497
UNIVERSAL JOINT
Filed Nov. 23, 1931    2 Sheets-Sheet 1
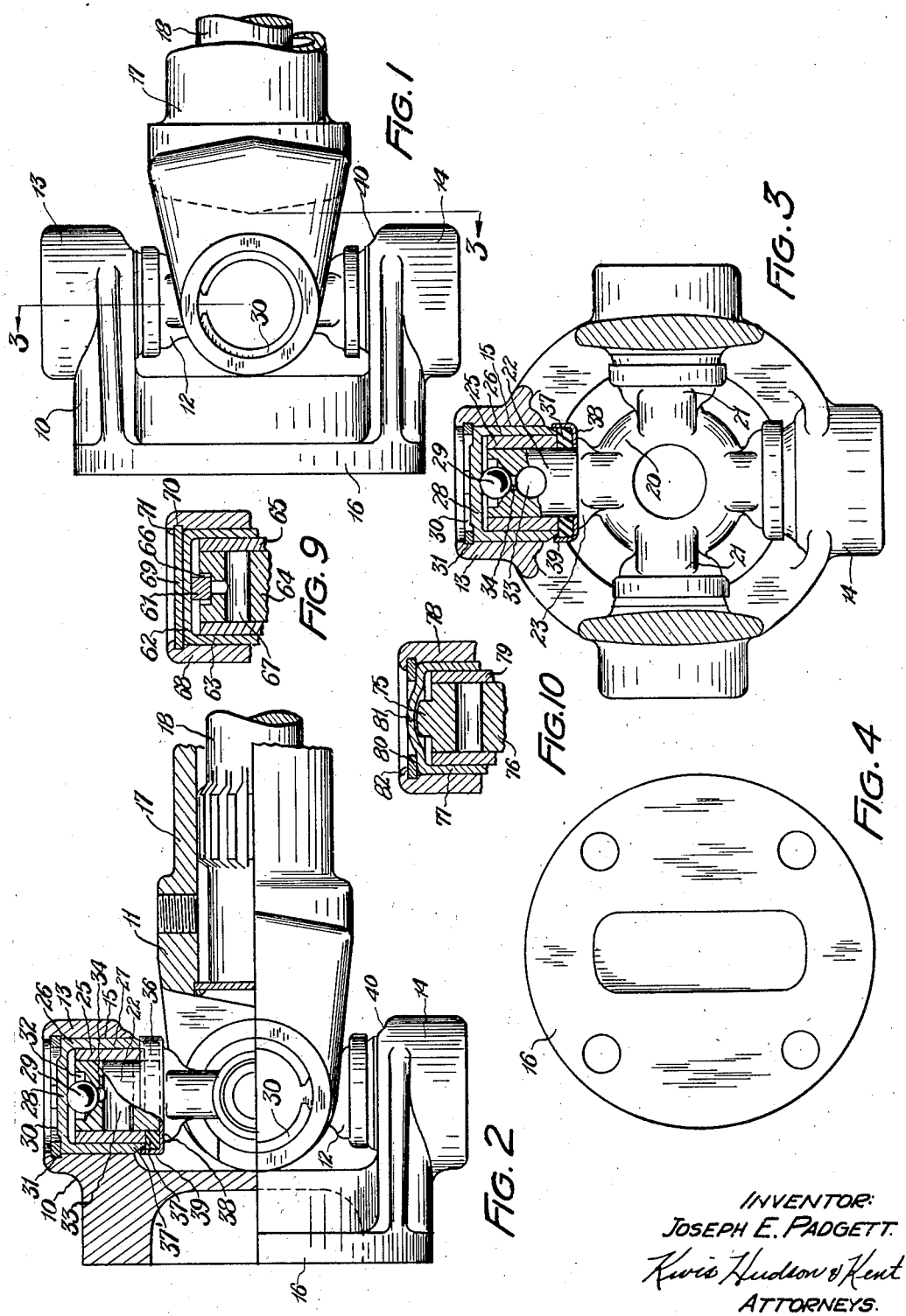
INVENTOR:
JOSEPH E. PADGETT.
ATTORNEYS.

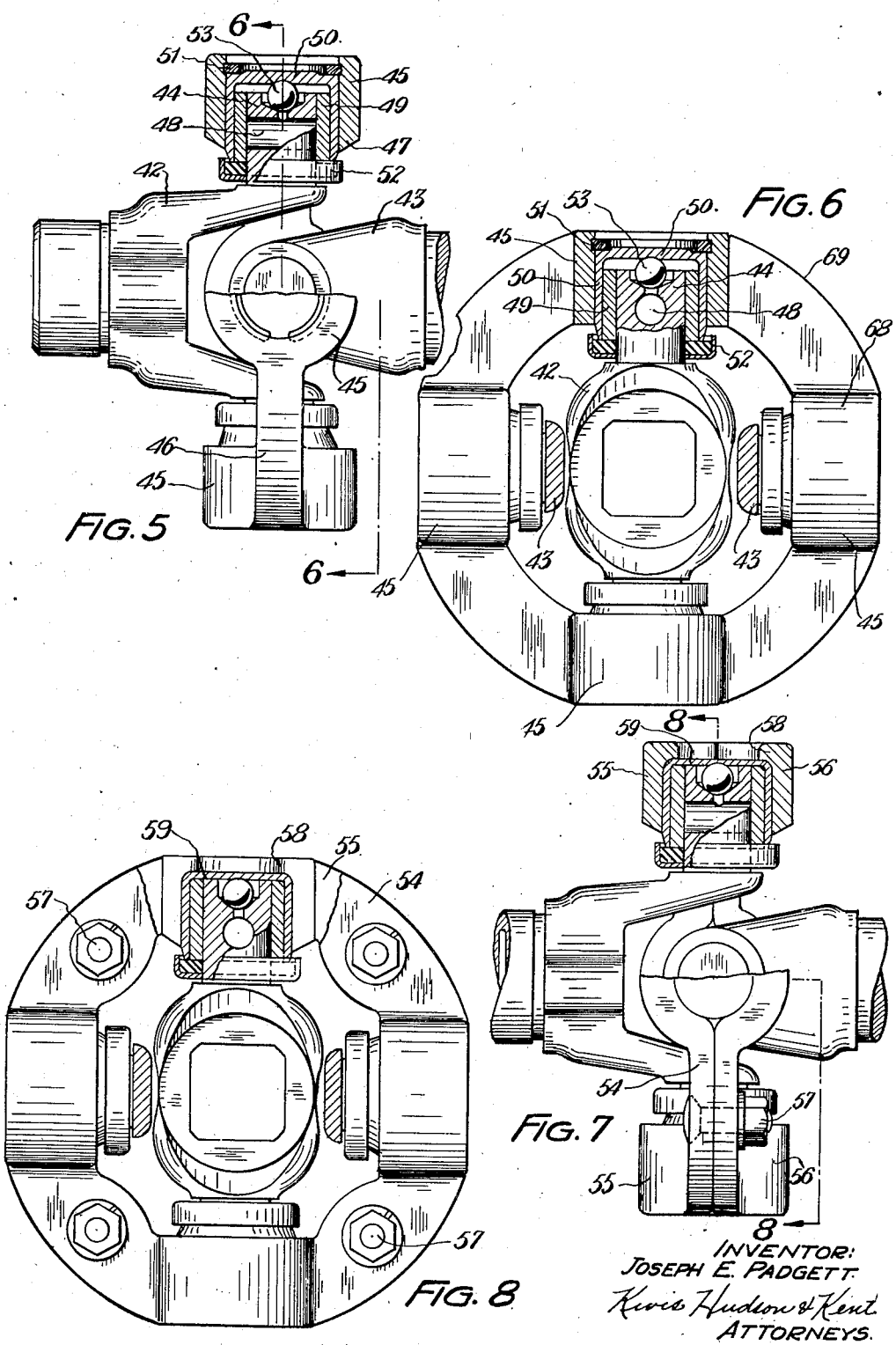
Feb. 8, 1938.   J. E. PADGETT   2,107,497
UNIVERSAL JOINT
Filed Nov. 23, 1931   2 Sheets-Sheet 2
INVENTOR:
JOSEPH E. PADGETT
ATTORNEYS.

Patented Feb. 8, 1938

2,107,497

UNITED STATES PATENT OFFICE 2,107,497

UNIVERSAL JOINT

Joseph E. Padgett, Toledo, Ohio

Application November 23, 1931, Serial No. 576,665

1 Claim. (Cl. 64—17)

This invention relates generally to power transmitting devices, and more particularly to an improved form of universal joint, and to a novel method of making universal joints.

The method herein disclosed but not claimed, is claimed in co-pending application, Serial No. 643,984, filed November 23, 1932.

An object of the present invention is to provide an improved power transmitting device of the type referred to, wherein novel means is employed for enclosing and lubricating the cooperating journal and bearing portions.

Another object of this invention is to provide a universal joint, wherein the journal portions are supported in bearings containing an initial supply of lubricant, and are provided with lubricant chambers adapted to replenish the lubricant content of the bearings.

Another object of this invention is to provide a universal joint of the type having self-lubricating means therein, and embodying a novel form of sealing means.

Still another object of this invention is to provide a universal joint of the type having a journal portion extending into the opening of a cooperating part, wherein the journal portion cooperates with a thrust element associated with a closure for said opening.

A further object of this invention is to provide a novel method for making universal joints, whereby a journal carrying member is accurately positioned with respect to the axis of a bearing carrying member, and at the same time proper clearance between the moving parts is obtained.

Further objects and advantages of this invention will be apparent from the following description, when taken in conjunction with the accompanying sheets of drawings, wherein Fig. 1 is an elevational view showing a universal joint constructed according to my invention.

Fig. 2 is a similar elevational view of the device, but showing the same partly in section.

Fig. 3 is a transverse sectional view taken substantially on line 3—3 of Fig. 1.

Fig. 4 is an end elevational view of one of the yoke members of my universal joint.

Fig. 5 is a side elevational view partly in section, showing another universal joint constructed according to my invention.

Fig. 6 is a transverse section thereof taken substantially on line 6—6 of Fig. 5.

Fig. 7 is a side elevational view partly in section, showing still another universal joint constructed according to my invention, and Fig. 8 is a transverse sectional view taken substantially on line 8—8 of Fig. 7.

Fig. 9 is a fragmentary sectional view showing another form of thrust element, and Fig. 10 is another fragmentary sectional view showing still another form of thrust element.

For a more detailed description of my invention reference will now be made to the accompanying drawings, wherein I have illustrated the preferred forms of my improved universal joint. Although the drawings illustrate specific forms of construction, it should be understood that my invention may be embodied in various other structural arrangements.

As illustrated in Figs. 1, 2 and 3 of the drawings, my improved universal joint comprises, in general, a pair of yoke members 10 and 11 and a cross 12, operatively connecting the yoke members together. As is well known, the useful life of a device of this kind is largely dependent upon an adequate supply of lubricant being provided for the moving parts. In accordance with my invention, as will be explained in detail hereinafter, I have provided novel means whereby the cooperting moving parts are efficiently lubricated, and their useful life materially prolonged beyond the period of usage heretofore attained by oilless bearing or by periodic manual lubrication.

The yoke members 10 and 11 are, generally speaking, similar as to construction and arrangement, each being provided with a pair of arms 13 and 14, which are spaced apart and provided with axially aligned openings 15 extending therethrough. These yoke members may be provided with any suitable connecting means for cooperation with the shafts, or other parts with which the device is to be used. In this instance, the yoke 10 is shown as being provided with a circular flange 16 adapted to be attached to a part from which power is to be transmitted, and the yoke member 11 is shown as being provided with a sleeve 17, which is splined for cooperation with the splined end of a torsion transmitting shaft 18, such as the propeller shaft of a motor vehicle.

The cross 12 may comprise a body portion 20, having any suitable shape or form, such as the ring-shape shown in Fig. 3, and integral arms 21 extending radially outwardly from the body and terminating in journal portions 22, the latter being in the form of cylindrical pins. The arm portions of the cross are four in number, and are paired in diametrically opposed relation, as shown in Fig. 3 of the drawings. This member is so constructed and arranged, that when in assembled position the journal portions 22 of one pair of aligned arms extend into the openings 15 of the yoke member 10, while the journal portions of the other pair of aligned arms extend into the openings of the yoke member 11. As shown in the drawings, each arm of the cross is provided with abutment means, preferably in the form of the laterally extending lugs 23 disposed at the inner end of the journal portions. The function of this abutment means will be explained hereinafter.

My universal joint, as thus far described, does not differ materially from joints of this general type which have been available heretofore, but in accordance with my invention a novel arrangement is provided, wherein the journal portions of the cross are self-lubricating, and are enclosed within the arm portions of the yokes in such a manner as to prevent the escape of lubricant and the entry of foreign material. As is shown in Figs. 2 and 3 of the drawings, the openings 15, provided in the arm portions of the yokes, are of over-size diameter as compared with the diameter of the journal portions 22, extending thereinto. The openings 15 are made of over-size diameter principally for the purpose of facilitating the assembly of the cross in the yoke members, in accordance with the novel method of my invention hereinafter to be explained, and also to accommodate a bearing 25, and a closure member 26, the latter being preferably in the form of a cup-shaped cap. The bearing 25 is of tubular or bushing form, and while various materials or compositions may be used for this element, I prefer to employ a bearing which is of a sufficiently porous character to absorb and hold a relatively large quantity of lubricant. A suitable bearing of this kind may be formed by molding or extruding a mass composed of bronze, or other metal particles, mixed with graphite or the like. The bearing thus formed is charged with lubricant prior to assembly, and during the operation of the universal joint, this initial supply of lubricant is available for lubricating the surfaces of the journal portions. This bearing is mounted in the sleeve portion 27 of the closure member 26, which is, in turn, mounted in the opening 15 of the yoke arm, so that both the bearing 25 and the sleeve portion 27 surround the journal portion 22 of the cross. With the member 26 disposed in the opening 15, in this manner, the transversely extending bottom wall 28, of this member, forms a closure for the opening of the yoke arm at a point outwardly of the outer end of the journal portion 22, as shown in Fig. 2 of the drawings.

In a device of this kind it is important that the cross be accurately positioned with respect to the axes of rotation of the yoke members, so as to minimize unbalanced centrifugal forces, which tend to cause undesirable vibration. Accordingly, I have provided a thrust element, preferably in the form of the ball 29, in each of the yoke arms, for positioning the cross with respect to the axes of rotation of the yokes. As shown in Figs. 2 and 3 of the drawings, each thrust ball is disposed between the transverse wall 28, of one of the closure members 26, and the outer end of the journal portion extending into that closure member. The closure members are positioned within the openings of the yoke arms in definite relation to the axis of the yoke, and are retained in this position by any suitable means, such as the expansible retaining rings 30, which are snapped into annular retaining grooves 31, provided adjacent the outer ends of the openings in the yoke arms.

It is desirable, in an arrangement of this kind, to have all of the parts of the device located as close as possible to the axis of rotation, and accordingly the outer ends of the journal portions are provided with counterbored recesses 32, in which the thrust balls 29 are disposed. In the arrangement as thus far described, it will be seen that the bearings 25 will cooperate efficiently with the journal portions 22 extending therein, and at the same time the thrust balls 29 cooperate with the closure members 26 to accurately position the cross with respect to the axis of rotation of the device.

The bearings 25 are capable of giving efficient service during ordinary usage by reason of their self-lubricating characteristic, but according to my invention the useful life of the device is materially prolonged by providing additional lubricating means. This additional lubricating means consists in the provision of a lubricant chamber 33 in each of the journal portions of the cross. This lubricant chamber may be of any suitable shape or form, but is preferably simply an opening extending through the journal portion and closed at its ends by the bearing member 25. Before the cross and yoke members are assembled, this chamber is charged with a suitable lubricant, which, after assembly of the parts, is supplied to the cooperating surfaces of the journal portions and bearing members during the operation of the device. To provide for the delivery of some of the lubricant from the chamber 33 to the thrust ball 29, I provide a passage 34, which connects the lubricant chamber with the counterbored recess 32, and which is normally closed by the thrust ball 29. It will be seen from the arrangement described, that the supply of lubricant contained in the journal portions provides for the efficient lubrication of the thrust balls 29, and, in addition, supplements the lubricating material incorporated in the bearings 25, in providing adequate lubrication for the cooperating moving parts.

As explained above, the transverse wall of the member 26 constitutes a closure means for the opening of the yoke arm, which closure means is located outwardly of the outer end of the journal portion extending into the yoke arm. This closure means prevents the lubricant from being thrown outwardly of the device by centrifugal force, and also prevents entry of grit and other foreign matter which would damage the cooperating surfaces of the moving parts. To prevent the escape of lubricant adjacent the inner end of the journal portions, and to prevent the entry of foreign material at this point, I provide sealing means which surrounds the journal portions immediately adjacent the abutment lugs 23. While various forms of packing material or sealing devices may be employed for this purpose, I prefer to employ a novel and efficient form of sealing device which I have devised. This device comprises a cup-shaped metal shell 36 and a ring of cork or other yielding material 37, which is disposed in the metal shell. As shown in the drawings, the metal shell 36 is preferably formed with a transversely extending wall 38 which engages the abutment lugs 23, and through which the journal portion 22 snugly extends. The wall portion 38 is provided around its outer edge with an angularly disposed retaining and protecting flange 39, which extends in the axial direction of the journal portion 22 and surrounds the sealing ring 37. The flange 39 is made sufficiently long to extend beyond the sealing ring 37 and to telescope over the inner end of the sleeve portion 27. If desired the inner end of this sleeve portion may be made of reduced diameter, as by providing the same with the tapered portion 37', and when the metal shell 36 is in assembled position, as shown in the drawings, the flange 39 telescopes around this reduced portion, so as to overlie the point of engagement of the sleeve portion and the bearing member with the sealing ring 37.

It will be seen, from the arrangement described, that when the cross is assembled in the yoke members with the journal portions extending into the closure members 26, the packing rings of the sealing members will be pressed against the inner ends of the closure members and of the bearings 25 by the abutment members 23 acting against the transverse wall 38 of the metal shell. The flange 39 being extended into telescopic relation around the inner end of the sleeve portion 27, causes water or other foreign substance to be shed or deflected away from the sealing ring 37. Thus the closure members 26, together with the sealing members 37, provide an enclosure for the journal portions 22 whereby the supply of lubricant is conserved and retained within the device, and grit and other foreign material is excluded.

In obtaining the accurate positioning of the cross with respect to the axes of the yoke members referred to above, I employ a novel method for assembling these members. In accordance with my method, the aligned journal portions of the cross are first inserted into the aligned openings of the arms of the yoke members. This can be readily done since, as explained above, the openings 15 are of over-size diameter as compared with the diameter of the journal portions, and by tilting the cross the journal portions can be easily inserted in succession in their respective openings. The insertion of the journal portions into the over-size openings of the yoke members can be facilitated to some extent by notching out one or both of the arm portions of the yoke members, as indicated at 40 in Figs. 1 and 2 of the drawings. After the journal portions of the cross have been inserted into the over-size openings of the yoke members, the cup-shaped closure members 26 are pressed into the openings of the yoke members, with the thrust balls 29 interposed between the ends of the journal portions and the transverse walls 28. The bearing members 25 may be assembled around the journal portions prior to the insertion of the closure members 26, but are preferably pressed into the closure members by a previous operation, so that as the closure members are pressed into the openings of the yoke members, the bearing members will telescope over the journal portions and will be accurately positioned upon the same. During the operation of pressing the closure members 26 into the openings of the yoke members, the thrust balls 29 are subjected to compression, whereby these balls are slightly depressed into the metal of the transverse walls 28, substantially in the manner that the ball element is depressed into the surface of a test piece in making a Brinell hardness test. After the closure members 26 have been pressed into the arms of the yoke members a predetermined distance to thereby slightly Brinell the thrust ball 29 into the metal of the wall 28, the pressure is released. By virtue of the inherent resilience of the metal and the strains produced in the various parts which have been subjected to the compressive force, the release of the pressure results in a slight clearance being established between the thrust ball and the transverse wall 28 and between the thrust ball and the end of the journal portion 22, which clearance permits efficient lubrication of these parts but prevents any material displacement of the cross with respect to the axis of rotation of the device.

In assembling the cross members 26 into the openings of the yoke members, any suitable apparatus may be employed, but I prefer to use a fixture so designed that pressure can be simultaneously applied to the closure members located at opposite ends of a yoke member, and such that the exerted pressure will be equalized between the two closure members during the operation. After the closure members have been pressed into the openings of the yoke members, and while the compressive force is being maintained the retaining rings 30 are snapped into place to prevent displacement of the closure members. The subsequent release of the compressive force results in the desired clearance being established between the moving parts.

In Figs. 5 to 8 of the drawings I have shown universal joints of the ring type, which embody the novel construction of my invention, and which may be assembled according to my method. The joint illustrated in Figs. 5 and 6 comprises yoke members 42 and 43 each having a pair of oppositely extending journal portions 44 which project into bearing portions 45 of the ring 46.

The ring and bearing portions are formed as an integral part, the bearing portions being provided with oversize openings into which the journal portions are inserted at assembly of the device. To facilitate the insertion of the journal portions into the oversize openings of the bearing portions, the latter may be suitably cut away as indicated at 47. In this arrangement, as in Fig. 2 of the drawings, the journal portion is provided with a lubricant chamber 48, and is surrounded by a bearing member 49. Likewise, as in Fig. 2, I provide a closure cup 50, which is retained in the opening of a bearing portion of the ring, as by means of the snap ring 51, and a sealing device 52, which cooperates with the inner end of the closure cup 50. A thrust element, preferably in the form of the ball 53, is disposed between the journal portion and the transverse wall of the closure cup.

In Figs. 7 and 8, I have shown a universal joint, which is in all respects identical with the joint illustrated in Figs. 5 and 6, with the exception that the ring 54 is formed of complemental members 55 and 56 secured together as by means of bolts 57. In this arrangement the members 55 and 56 are formed with integral shoulder portions 58 which provide a retaining means for the closure cups 59 when the members are clamped together at assembly of the device.

I prefer to use a thrust element in the form of a ball, as referred to above, but if desired, various other forms of thrust elements may be employed. For example, as shown in Fig. 9 of the drawings, a thrust element 61 of button-like form may be provided intermediate the transverse wall 62, of the closure member 63, and the outer end of the journal portion 64. This button-like element, and the bearing member 65 which surrounds the journal portion, may be formed of any suitable material, but are preferably made of lubricant absorbing material, such as the bearing material referred to above. In this arrangement, the journal portion is provided with a recess 66 in its outer end, in which the thrust button is disposed, and with a lubricant chamber 67 for replenishing the lubricant content of the bearing 65 and of the thrust button. The closure member 63 is assembled into the opening of the yoke member 68 by being pressed into the latter, substantially in the manner of my method described above. The pressure applied during the assembling operation is sufficient to cause the thrust button to be distorted somewhat by being compressed between the closure member and the journal portion, but this pressure is insufficient to cause permanent distortion of the transverse wall of the closure member. While the assembling pressure is being applied, a retaining member 69, preferably in the form of an imperforate disk or plate is fixed in an annular groove 70, provided adjacent the outer end of the opening of the yoke member, by displacing a portion of the metal of this member, as by means of a suitable rolling or swaging operation, to form the annular locking shoulder 71. After the closure member 63 has been pressed into the yoke member for the desired distance, and the annular locking shoulder 71 has been formed for holding the retaining member 69 in place, the assembling pressure is released whereby the desired clearance is obtained between the moving parts of the assembly.

In Fig. 10 of the drawings, I have shown another arrangement wherein the thrust element is in the form of a button-like projection 75 integrally formed at the outer end of the journal portion 76. During the assembling operation, in accordance with the method of my invention, a closure member 77 is pressed into the opening of the yoke member 78, so as to surround the bearing member 79 which cooperates with the journal portion. During this assembling operation, pressure is applied to the closure member and to a retaining ring 80, which engages the transverse wall 81 at the outer end of the closure member. This pressure causes the closure member to be moved into the opening of the yoke member the desired extent, and also causes the transverse wall 81 to engage the thrust button 75 and to be deflected by the latter into the opening of the ring 80, substantially as shown in Fig. 10 of the drawings. While this assembling pressure is being maintained, some of the metal of the yoke member is displaced, as by a suitable rolling or swaging operation, to provide the annular locking shoulder 82 which holds the retaining ring 80 in place. The assembling pressure is then released whereby the desired clearance is established between the thrust element and the deflected portion of the transverse wall 81.

Although the closure members 28 and 50 of the universal joint shown in Figs. 1 and 5, are preferably retained in place by the snap rings 30 and 51, these members may be retained in place, if desired, by means of a disk or ring, as shown in Figs. 9 and 10, in which case the disk or ring, as explained above, is held against displacement by swaging an annular shoulder on the yoke portion during the assembling operation. And on the other hand, the closure members shown in Figs. 9 and 10 may, if desired, be retained in place by the use of snap rings, such as those shown in Figs. 2 and 3.

It will now be readily seen from the universal joint construction herein illustrated and described, that I have provided a novel device of this kind which is self-lubricating, and which is capable of efficient service throughout a prolonged period of use. It will also be seen, that by the novel arrangement which I have provided, the supply of lubricant is conserved by being efficiently sealed within the device, and the entry of destructive foreign matter is prevented.

In addition to an initial supply of lubricant contained in the bearings of the device, a replenishing supply of lubricant, provided in the chambers located in the journal portions, enables the device to render prolonged efficient service without attention on the part of the machine operator. Furthermore, in my novel construction, and in the novel method of procedure which I have devised, the use of thrust elements at the ends of the journal portions increases the efficiency of the device, and enables the cross or yoke members, as the case may be, to be accurately positioned with respect to the axis of rotation without the need for the extremely accurate and costly machining heretofore required in devices of this kind. Obviously this accurate positioning tends to minimize unbalanced centrifugal forces and consequent vibrations.

While I have illustrated and described the device and method of my invention in a detailed manner, it should be understood, however, that I do not intend to limit myself to the exact steps of procedure nor to the precise details of construction and arrangements of parts as herein disclosed, but regard my invention as including such changes and modifications as do not involve a departure from the spirit of the invention and the scope of the appended claim.

Having thus described my invention, I claim:

In a universal joint, the combination of a pair of relatively movable members one having an opening therein and the other having a journal portion extending into said opening, means for closing said opening outwardly of said journal portion, an apertured retaining member disposed in said opening outwardly of said closing means to prevent displacement of the latter, said closing means having a portion thereof deflected into the aperture of said retaining member, and a thrust element associated with said journal portion and engaging the deflected portion of said closing means.

JOSEPH E. PADGETT.